April 22, 1958   R. J. GALLAGHER ET AL   2,831,925
PREPAY PAYSTATION HAVING IMPROVED COIN HOPPER MECHANISM
Filed Dec. 7, 1953   3 Sheets-Sheet 1

INVENTORS.
RAY JOHN GALLAGHER
CLARENCE E. LOMAX
BY
ATTY.

April 22, 1958   R. J. GALLAGHER ET AL   2,831,925
PREPAY PAYSTATION HAVING IMPROVED COIN HOPPER MECHANISM
Filed Dec. 7, 1953   3 Sheets-Sheet 2

INVENTORS.
RAY JOHN GALLAGHER
CLARENCE E. LOMAX
BY

ATTY.

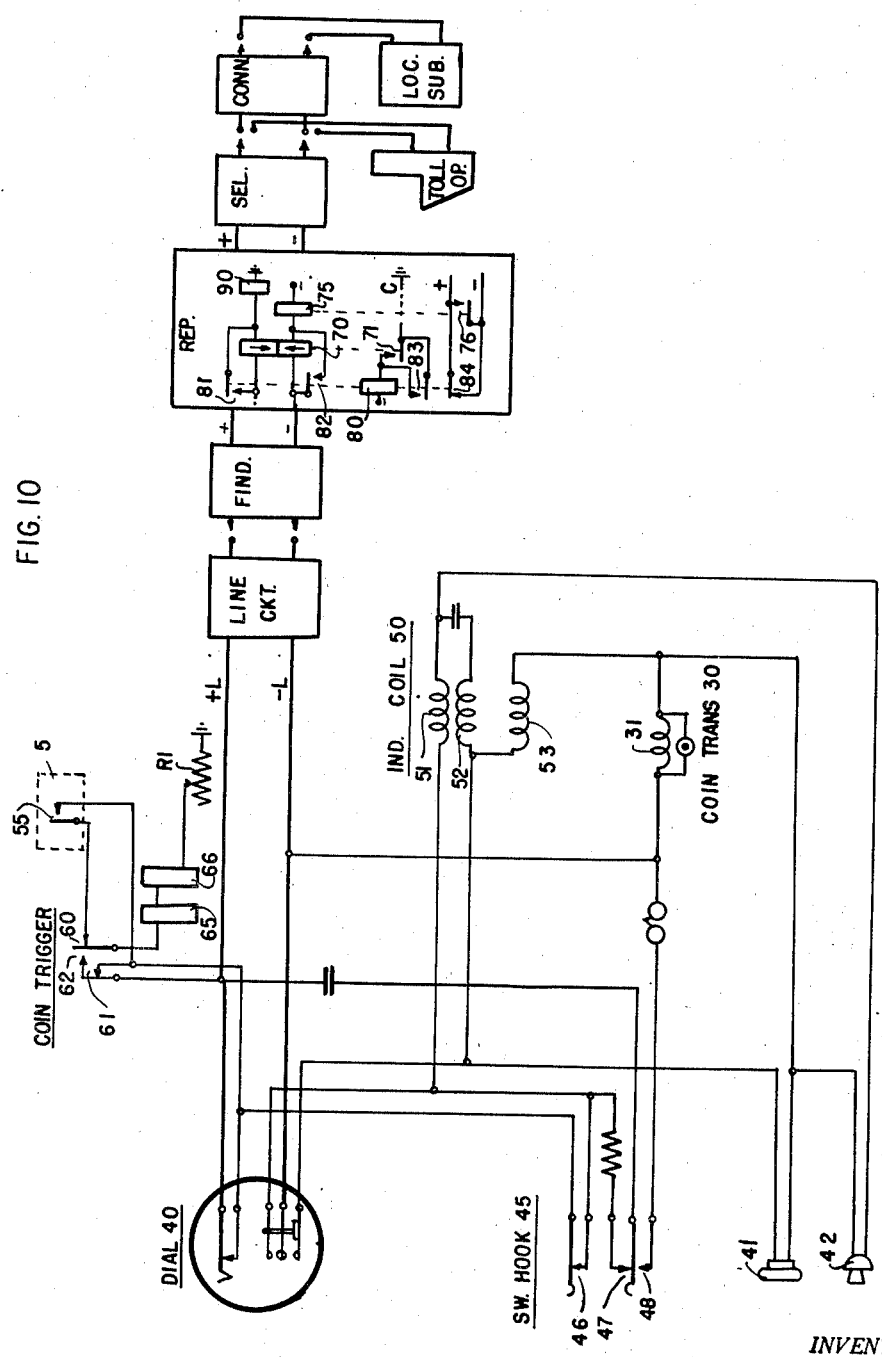

2,831,925

PREPAY PAYSTATION HAVING IMPROVED COIN HOPPER MECHANISM

Ray John Gallagher, River Forest, and Clarence E. Lomax, Chicago, Ill., assignors to General Telephone Laboratories, Incorporated, a corporation of Delaware Application December 7, 1953, Serial No. 396,478

3 Claims. (Cl. 179—6.5)

The present invention relates in general to telephone paystations and more specifically to coin controlled actuating devices particularly adaptable for use with prepay telephone paystations.

As applied to prepay telephone paystations, the primary object of our invention is to provide a simple, economical, efficient and improved paystation circuit arranged for use with an improved coin controlled actuating device of a prepay telephone paystation, wherein satisfactory talking connections may be established subsequent to the deposit of a coin, or coins, of specific denominations.

Heretofore whenever it was desired to establish talking connections between a calling paystation and a called local party, when using a standard type automatic prepay paystation, the deposit of a coin of a certain denomination (such as five cents or one nickel) was the usual required fee before the call could be extended. However, due to the changed present day economic conditions resulting in rising costs, many telephone companies have been forced to increase the charge on such local calls to ten cents, or one dime or two nickels. Therefore, it has become necessary, that a ten cent coin or the equivalent perform the same functions previously accomplished by the five cent coin. Thus, in order to accomplish the above requirements due to the increased fee, it has been found necessary to modify the previous standard automatic paystation and provide a circuit for use therewith, whereby the increased fees are accommodated, while still providing satisfactory and reliable service.

Referring to U. S. Patents 1,383,472 and 1,886,409, issued July 5, 1921, and November 8, 1932, respectively, both to G. A. Long, it will be noted that these combined patents may be taken as one disclosure of a standard automatic paystation telephone and a standard coin hopper with a coin controlled actuating mechanism. This paystation telephone with this coin hopper and associated mechanism may be taken as the aforementioned standard type paystation telephone, wherein the deposit of a coin (such as five cents or one nickel) was the previously designated fee charged for all local paystation calls.

Referring in particular to a co-pending application filed November 29, 1949, Serial No. 129,923, to Ray John Gallagher, it will be seen that such application presents certain modifications to the above-cited reference patents, whereby the present increased fees are accommodated for all local paystation calls. Our invention discloses an arrangement somewhat similar to the above-cited co-pending application but further discloses in detail additional new, different and useful modifications to both the cited reference patents and co-pending application, whereby the primary object is readily and more easily accomplished than has been done heretofore.

Another object of the invention is to provide means which will accomplish the primary object and still be sufficiently adaptable for converting existing equipment without excessive cost.

A feature of the invention is the provision of a coin hopper mechanism which will accept one quarter, one dime or two nickels to establish talking connections when a local paystation call is initiated, but will allow the first nickel to be returned upon hanging up of the receiver, if a second coin of any denomination is not deposited.

Another feature of the invention is the provision of means whereby the initial deposit of a single nickel connects the grounded coin magnets to the negative talking conductor for preventing subsequent pulses from being effective, but in which the initial deposit of a quarter or dime connects the magnets to the positive talking conductor in order to render the subsequent pulses effective.

Still another feature of the invention relates to the provision of means whereby the deposit of a single nickel connects the grounded coin magnets to the negative talking conductor for preventing the transmission of pulses, but in which the deposit of a second nickel, a dime or quarter, before the first nickel has been disposed of, results in transferring the connection of the coin magnet to the positive talking conductor so that pulses may then be transmitted.

Referring to the above-mentioned co-pending Gallagher application, it will be noted that the coin chute having the additional coin channel provided for nickels and illustrated in Figs. 4 and 5 of said application has been taken as one form of a suitable coin chute that may be used with our present invention and is represented by Figs. 2 and 3 in our disclosure. Reference may be had to this co-pending application for a more complete description and understanding of this coin chute.

A short description of the invention in its preferred form such as disclosed in the present application will follow. A paystation similar in physical appearance to the aforementioned cited reference Patent 1,383,472 is assembled, including therein a coin chute such as shown in Fig. 4 of the aforementioned co-pending application (Fig. 2 of our disclosure) and a coin hopper assembly also similar to that shown in the co-pending application, but modified as shown in Fig. 1 of our disclosure for cooperation therewith. The coin hopper consists of two separate longitudinal half-sections 1 and 2 with a deflector 3 having a vane 26 mounted between the two half-sections at a position near the mouth of the hopper and is so arranged that deflector 3 may partially rotate about a lower axis so that vane 26 of the deflector will move from a vertical or bisecting position and bear against a flange 25 provided in the rear section. Directly below the deflector and held between the two sections is a combined dividing plate and mounting plate 4. Within the hopper, the dividing plate 4 separates the interior of the hopper into two passageways which are continued down from the deflector when it is in its vertical or bisecting position. In this manner two coin passageways are provided in the coin hopper extending from the mouth of the hopper down to a position directly above the neck of the hopper. The usual coin trigger 6 projects through a slot provided in the front hopper section and extends only into the front coin passageway 1. The mounting plate 4 provides a number of flanges, two at the extreme ends pivotally support the deflector 3, another flange supports a rotary type microswitch 5, and a latch-mounting flange provides one end of a bearing support for the deflector latching element 9, which will be described hereafter. The deflector 3 consists of a bearing ear at each end, the main deflecting vane 26 within the mouth of the hopper, a restoring finger 11 projecting downward and outward at an angle, an operating finger 10 projecting upward and biased by the actuating arm 17 of the microswitch 5, and a locking finger 12 projecting downward and outward at a very slight angle. The deflector latching element 9 is pivotally mounted between the right-hand flange of the mounting plate 3 and the latch-mounting flange. A catch 13 on the latching element 9 engages the locking finger 12 and the locking finger is held in this position due to the bias exerted by the mocroswitch actuating arm 17 against the operating finger. A restoring element 7 is pivotally mounted adjacent the coin trigger 6 and is arranged to engage the restoring finger 11 of deflector 3 for restoring, or resetting, the deflector to its normal locked position. A pivotally mounted wire trigger 22 is provided having one end extending across the back coin passageway only and the other end inserted through the hole 24 of the deflector latching element bearing pin 23 and being then bent downward to engage the lower inward side of the latching element 9.

The following brief operational description of the invention discloses that with the paystation taken into use for establishing a local call, and with a deposited first nickel travelling down the special nickel passageway of the coin chute, this nickel enters the rear coin passageway 2 of the hopper and by-passes the regular coin trigger 6. This deposited nickel however, strikes the inner end of the wire trigger 22 thereby pushing it downward so that it rotates at right angles to the axis of the latching element bearing pin 23, but about the hole 24 provided therein. The other end of the wire trigger 22 is thereby rotated upward and since it is under the deflector latching element 9, the latching element is rotated about its axis in a counter-clockwise direction until catch 13 on the latching element disengages the deflector locking finger 12. At this time the biasing action of microswitch actuating arm 17 against deflector operating finger 10 causes deflector 3 to rotate in a clockwise direction until deflector vane 26 comes to rest in notch 25 along the rear hopper section, thereby completely blocking the back coin passageway of the hopper. The above-mentioned movement of actuating arm 17 also operates microswitch 5 to close its associated contact. Since the latching element 9 is not equally balanced and therefore heavier toward the rear, its weight causes both it and wire trigger 22 to restore to approximately their normal position. However this has no effect at the present time. The stop 14 on the right-hand flange of the mounting plate prevents latching element 9 from returning too far past its normal position, while the right-hand bearing ear of deflector 3 prevents overthrow when element 9 is raised by the operation of wire trigger 22. If no additional coins are deposited, the closing of the microswitch contacts 55 only prepares a point in the refund circuit, which becomes effective subsequent to the hanging up of the receiver. However if a second coin such as a second nickel, a dime or a quarter is deposited, this second coin strikes the regular coin trigger 6 which causes the grounded coin magnets to be connected to the positive line conductor only so that subsequent pulsing can be accomplished in order to establish the desired connection. It will be noted that a deposited second nickel follows the same path until it reaches the coin hopper, at which time deflector vane 26 causes it to fall through the front passageway of the hopper with the same results as caused by an initially deposited dime or quarter.

Additional other features and advantages of this invention will become apparent upon a further perusal of the specification and claims, taken in conjunction with the accompanying drawings comprising Figs. 1–10 inclusive, which show by means of the usual diagrams a sufficient amount of apparatus to enable the invention to be described and understood and in which:

Figure 4A:
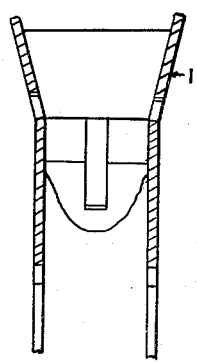
Fig. 4 is a side view of the upper portion of the coin hopper comprising the two sections.
Figure 4:
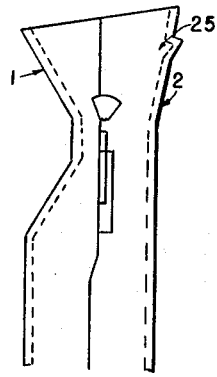
Figure 4B:
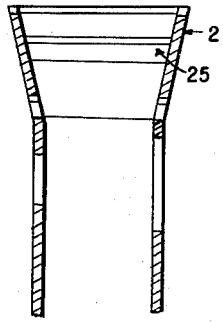

Figs. 4–A and 4–B are inside views of the upper portion of the front and back coin hopper sections with each showing their respective cut-away portions for accommodating other apparatus.

Figure 5:
Figure 5A:
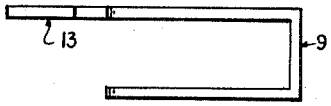

Figs. 5 and 5–A are two views showing the deflector latching element 9.

Figure 6B:
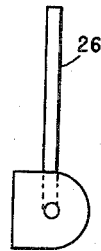
Figure 6:
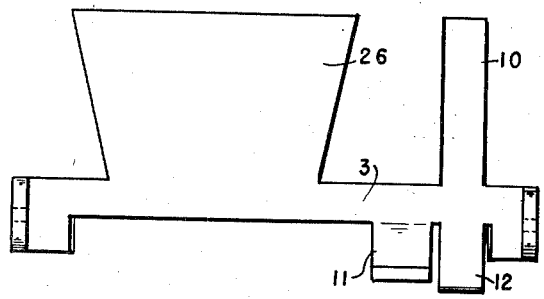
Figure 6C:
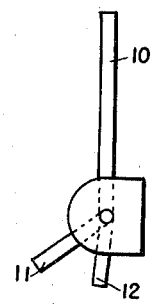
Figure 6A:
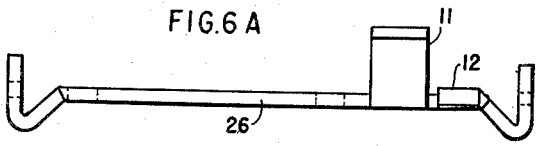

Figs. 6, 6–A, 6–B and 6–C are different views of the coin deflector vane with its deflecting blade, restoring trigger, operating finger and locking finger as shown.

Figure 7A:
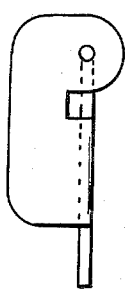
Figure 7:
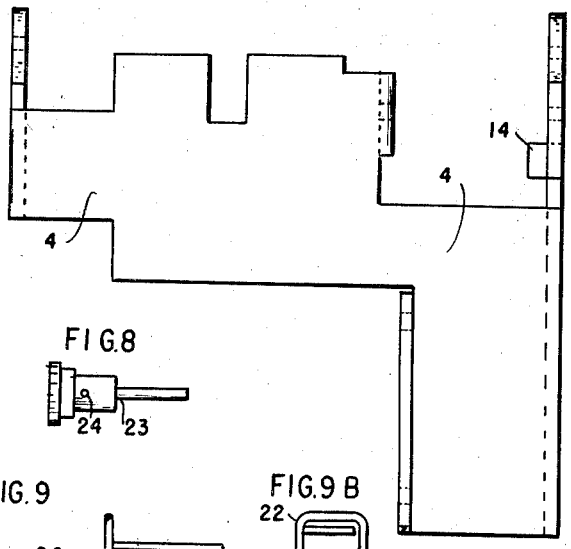
Figure 7B:
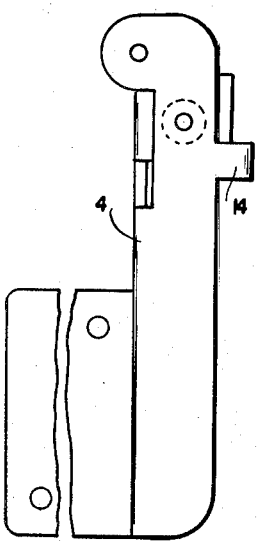

Figs. 7, 7–A and 7–B are different views of the combined dividing and mounting plate with its associated flanges.

Figure 8:
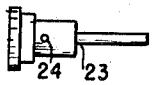

Fig. 8 shows the bearing pin for the latching element and the hole through which the wire trigger is pivotally mounted.

Figures 9, 9B:
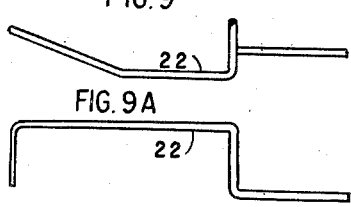
Figure 9A:
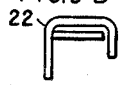

Figs. 9, 9–A and 9–B are perspective views of the wire trigger.

Fig. 10 is a schematic representation of a prepay paystation circuit designed to work in conjunction with a paystation including the illustrated coin controlled actuating apparatus.

Figure 1:
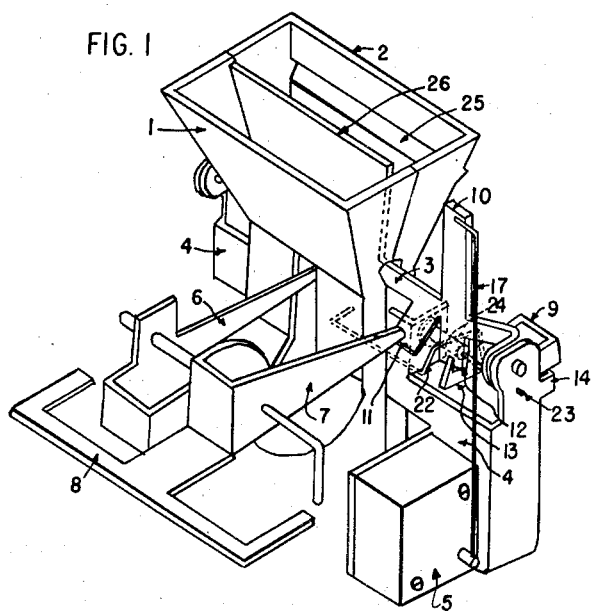
Fig. 1 is a perspective view of the coin hopper and the associated coin controlled actuating apparatus.
Figure 2:
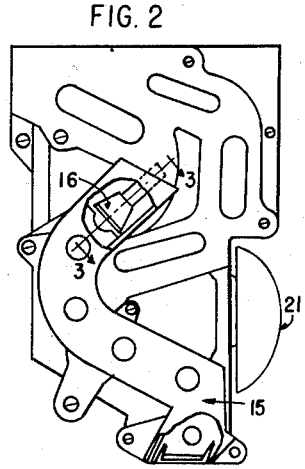
Fig. 2 is a rear view of the coin chute showing the separate nickel channel.

Referring to the drawings and in particular Figs. 1 and 10, a detailed operational description will now be given. Assuming that a calling party at a prepay automatic telephone paystation such as shown in the left-hand portion of Fig. 10 wishes to make a local call and has removed his receiver from hookswitch 45 and the contacts controlled thereby are as shown. The line of the calling paystation is thereupon seized in a well-known manner. It will be noted that before the calling paystation can dial the desired number, the shunt placed on his dial pulsing springs by coin trigger contacts 61 must be removed. This shunt can be removed only by the deposit of the proper coin or coins, which in the present case has been determined to be a minimum of ten cents, or two nickels or one dime.

Figure 3:
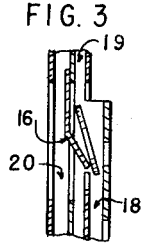
Fig. 3 is a cut-away sectional view of the coin chute taken from the left along the line 3—3 of Fig. 2.

Assuming in one instance that the party at the calling paystation first deposits a single nickel. Referring to Fig. 3 it will be seen that this nickel travels down the nickel coin channel 19 in the usual manner until it comes in contact with angle piece 16, at which time the nickel is caused to enter and travel down new nickel channel 18. It will further be assumed that the coin hopper and its associated coin control apparatus is in its normal position such as shown in Fig. 1. As the nickel leaves channel 18 it enters the rear coin passageway of the hopper and as such by-passes coin trigger 6 while striking the extreme left end of wire trigger 22, thereby pushing it down and causing it to pivot in hole 24 of bearing pin 23. The right end of wire trigger 22 is positioned under the inward side of latching element 9 and due to the pivoting or partial rotation of wire trigger 22, moves upward, thereby causing latching element 9 to partially rotate about its axis in a counter-clockwise direction. Latching element 9 continues its motion until catch 13 disengages from locking finger 12, thereby allowing the bias exerted on operating finger 10, by the actuating arm 17 of microswitch 5, to cause deflector 3 to partially rotate about its axis in a clockwise direction until the upper edge of vane 26 is positioned in notch 25 of the rear hopper section 2. The movement of actuating arm 17 of microswitch 5 also allows contact 55 to close, whereby coin magnets 65 and 66 are connected from ground to the negative line conductor. This connection may be traced from ground, resistance R1, through the windings of magnets 66 and 65, contacts 60 and 55, down through switch hook contacts 46, out over induction coil winding 51, down through transmitter 42, over the coin transmitter induction coil winding 31, up and out over the negative line conductor —L, through the line circuit, finder, differential relay 70 of the repeater, and through pulse repeating relay 75 to battery. Ground through coin magnets 65 and 66 is also connected over an obvious circuit including coin trigger contacts 61 to the positive line conductor +L. If the calling party should hang up at this time, pulsing relay 75 would restore and cause refund potential to be applied (not shown) to the line to refund the deposited nickel in a well-known manner.

At this time, it will be appreciated that the reference character 90 represents an impedance included in the circuit of differential relay 70 which is necessary for its proper operation. Further, it will be appreciated that with the ground applied to both line conductors, differential relay 70 and pulse repeating relay 75 are both held operated. This same ground on both line conductors also obviously shunts the pulsing contacts of dial 40 so that any operation of the dial at this time will not operate the repeater equipment. With contacts 71 of differential relay 70 closed, an obvious circuit is completed for operating relay 80 by way of the grounded control conductor. Contacts 81 and 82 of operated relay 80 shunt both windings of differential relay 70 to provide a more effective subsequent pulsing circuit. Relay 80 locks itself operated by way of contacts 83 and at contacts 84 removes a shunt from pulse repeating contacts 76. Pulse repeating relay 75 closes its pulse repeating contacts 76 with no effect at the present. When the aforementioned ground is connected to the positive line conductor +L only (as will be described in detail later on), the pulsing contacts of dial 40 are no longer shunted. Therefore, any operation of the dial will cause the energizing circuit of pulsing relay 75 to be interrupted and this relay will respond to these interruptions and cause them to be repeated at its pulse repeating contacts 76.

Before continuing further with the present description, it is thought best to mention that the actual position of coin magnets 65 and 66 shown in Fig. 10 have not been physicaly shown in Fig. 1, since the position of these magnets and coin trigger contacts is assumed to be well-known in the art. However, a ready reference may be had to Fig. 1 of the previously mentioned co-pending application to see that these coin magnets and their tippable armature assembly are located directly below the restoring lever, such as 8, of our instant application. A further reference to this co-pending application also discloses that if either magnet is energized, the opposite end of the tippable armature moves upward to engage lever 8 and thereby also move this lever upward so that the restoring trigger 7 is partially rotated in a clockwise direction about its axis. In this manner, the movement of trigger 7 exerts force against restoring finger 11 for moving deflector 3 back to its normal vertical position, at which time locking finger 12 is engaged behind catch 13 of latching element 9 to maintain the deflector 3 in its normal position. The microswitch actuating arm 17 is also returned to its normal position, thereby opening contact 55.

Continuing with the present operation, if a second nickel (a dime or a quarter will also cause similar operations) is deposited subsequent to the first nickel, this second nickel travels the same path in the coin chute as described for the first nickel, up to and including the time that the coin leaves the chute and enters the hopper. At the time that the second nickel enters the hopper it is guided into the front coin passageway of the hopper by means of vane 26, which at the present is blocking the rear coin passageway. As the second nickel continues down the front coin passageway it strikes and operates coin trigger 6. In operating, coin trigger 6 first opens contact 60, then closes contact 62 and then opens contact 61 in the named sequence. It will be remembered that all coins drop to the coin platform (not shown) in the lower part of the coin hopper which is assumed to be of the standard type. The removal of the coin magnets 65 and 66 from the negative line conductor —L, and the connecting of these magnets to the positive line conductor +L thereby conditions the operating circuit of the pulsing relay 75 so that it will respond to pulses received from the dial, as hereinbefore described, when it is operated.

The opening of coin trigger contact 60 as above noted, disconnects coin magnets 65 and 66 from the previously described connection with the negative line conductor —L, while the closing of contact 62 connects the coin magnets to the positive line conductor +L over an obvious circuit and the opening of contact 61 removes the previously mentioned shunt from the dial pulsing springs. Thus, at this time it will be noted that a total of two nickles, or ten cents has been deposited and the calling paystation is now able to dial the number of the desired local party so that an effective talking connection may be established in a well-known manner.

At the end of conversation and subsequent to hanging up of the receiver, coin collect potential is applied to the line in a well-known manner for collecting the deposited coins, and the restoring lever 8 is operated by the tippable armature (not shown) of the coin magnets as previously described for restoring deflector 3 to its normal and locked position.

Assuming in another instance that the party at the calling paystation does not have two nickels, the desired local connection may be completed by depositing either one dime or one quarter as hereafter described, but bearing in mind that the deflector 3 has not been operated and is therefore in its illustrated normal position shown in Fig. 1. The deposited dime or quarter travels down the normal coin channels provided in the coin chute for these coins and enters the front coin passageway of the coin hopper. The deposited coin continues down the hopper to strike and operate coin trigger 6. The operations hereafter are the same as previously described when a second nickel was deposited, including the restoring of the equipment to normal.

If a toll call is made, the equipment functions the same as described when either two nickels or one dime or one quarter was deposited, but connecting with a toll operator instead of a local party.

It will be appreciated that if only a single nickel is deposited, it is necessary that the calling party hang up before the coin can be refunded. The pulsing relay such as 75 of the repeater controls the application (not shown) of refund potential to the line and this is only accomplished when the pulsing relay restores. Therefore, after a single nickel is deposited the pulsing relay is held operated over the negative line conductor —L to ground the coin magnets by way of closed hookswitch contact 46. It is thus evident that the receiver must be hung up to open contact 46 so that pulsing relay 75 may restore in order to apply the refund potential. Latching element 9, by locking deflector 3 in its vertical position, prevents deflector 3 from being jarred into its operated position so that fraudulent use of the paystation is prevented.

Having described our invention and what is considered new and desired to have protected by Letters Patent will be pointed out in the appended claims.

What is claimed is:

1. In a telephone paystation for connection to a telephone line and including a coin chute having a plurality of different dimensional coin channels provided therein for accommodating respective sized coins of different denominations, a coin hopper mounted directed below the coin exit of said chute and comprising two separate longitudinal half-sections, a coin controlled actuating device including a rotatably mounted deflecting means having a deflector vane positioned within the mouth of said hopper and bisecting said mouth when said deflecting means is in its normal position, a combined dividing and mounting plate mounted directly below the lower edge of said deflecting means and securely held in place between said two hopper sections, said plate providing two coin passageways within said hopper and said plate providing bearing points external of said hopper for pivotally mounting said deflecting means, a latching element, other bearing points on said plate external of said hopper for pivotally mounting said latching element, locking means including a locking finger external of said hopper and integral with said deflecting means arranged to be engaged by said latching element for maintaining said deflecting means in said normal position, an operating finger external of said hopper and integral with said deflecting means, a rotary circuit closer mounted on said plate including a biased affixed actuator for operation thereby, said actuator operatively engageable with said operating finger due to said bias for maintaining said engagement between said latching element and said locking finger, a first coin trigger projecting into one of said coin hopper passageways, a second coin trigger having one end projecting into the other of said coin hopper passageways and the other end operatively connected with said latching element, means for transmitting impulses from a calling paystation over said line, a grounding circuit having ground applied thereto, said second coin trigger operated only by a deposited first coin of a certain denomination for moving said latching element to disengage from said locking finger to render said biased actuator effective for moving said operating finger and said deflecting means until said other coin hopper passageway is blocked by said deflector vane, contacts in said circuit closer operated by said movement of said actuator for connecting said grounding circuit to both line conductors of said line, said deflector vane guiding a second deposited coin of said certain same denomination into said one coin hopper passageway for operating said first coin trigger, and means including contacts operated by said operated first coin trigger for rendering said transmitting means effective for impulsing by means of said grounding circuit over said line.

2. In a telephone paystation wherein a coin chute comprising a plurality of different dimensional coin channels for accommodating respective sized coins of different denominations is mounted with the coin exit of said chute directly over a coin hopper comprising two separate longitudinal half-sections, the combination of a coin controlled actuating device including a rotatably mounted deflector having a vane thereon positioned within the mouth of said hopper and bisecting said mouth when said vane is in its normal position, a combined dividing and mounting plate securely held in place between said two hopper sections at a position directly below the lower edge of said deflector vane, said plate providing two coin passageways within said hopper and said plate providing bearing points external of said hopper for said rotatably mounted deflector, an operating finger and a locking finger each integral with and separately formed at one end of said deflector external of said hopper, a latching element pivotally mounted on said plate external of said hopper and normally engaging said locking finger for maintaining said vane in its normal bisecting position, a rotary circuit closer mounted on said plate having a rotatably affixed actuator and means for biasing said actuator for operation, said actuator operatively engaging said operating finger due to the biasing action of said closer on said actuator for maintaining said engagement between said latching element and said locking finger, a pivotally mounted first coin trigger having one end projecting into one of said coin hopper passageways, a pivotally mounted second coin trigger having one end projecting into the other of said coin hopper passageways and having the other end operatively engageable with said latching element, said second coin trigger operated only in case a first coin of a certain denomination is deposited, for rotatably moving said latching element to disengage from said locking finger, said biasing action of said closer causing said affixed actuator to move said operating finger, whereby said deflector is rotatably moved until said vane completely blocks said other coin hopper passageway and said circuit closer is operated, said vane thereafter guiding a second deposited coin of said certain same denomination into said one coin hopper passageway for operating said first coin trigger, only said first coin trigger being operated in case the first deposited coins are of other denominations than said certain denomination for enabling said paystation to initiate telephone connections.

3. A telephone paystation such as claimed in claim 2, including a restoring finger also integral with and separately formed at said one end of said deflector external of said hopper, and means engageable with said restoring finger when operated, for rotatably moving said deflector until said vane is in said normal bisecting position and said latching element is in said engagement with said locking finger.

References Cited in the file of this patent

UNITED STATES PATENTS

| | | |
|---|---|---|
| 447,343 | Morse | Mar. 3, 1891 |
| 1,934,679 | Donorden | Nov. 14, 1933 |
| 2,179,091 | Hoyt et al. | Nov. 7, 1939 |
| 2,204,083 | Hoyt | June 11, 1940 |
| 2,251,073 | Shann | July 29, 1941 |
| 2,674,655 | Gallagher | Apr. 2, 1954 |

FOREIGN PATENTS

| | | |
|---|---|---|
| 570,194 | Germany | Feb. 14, 1933 |